United States Patent [19]

Rodriguez

[11] Patent Number: 5,058,469

[45] Date of Patent: Oct. 22, 1991

[54] CABLE SHEAR AND CLAMP SYSTEM

[76] Inventor: Alan Rodriguez, 2218 Crown Rd., Dallas, Tex. 75229

[21] Appl. No.: 609,831

[22] Filed: Nov. 6, 1990

Related U.S. Application Data

[63] Continuation of Ser. No. 396,341, Aug. 21, 1989.

[51] Int. Cl.$^5$ .............................................. B26D 1/00
[52] U.S. Cl. ............................................ 83/13; 83/199
[58] Field of Search .................................... 83/13, 199

[56] References Cited

U.S. PATENT DOCUMENTS

| | | |
|---|---|---|
| 1,216,426 | 2/1917 | Erickson .............................. 83/199 |
| 3,289,379 | 12/1966 | Watts . |
| 3,833,706 | 9/1974 | Edwards . |
| 4,561,226 | 12/1985 | Tourneur . |
| 4,616,458 | 10/1986 | Davis et al. . |
| 4,621,943 | 11/1986 | Swanson . |
| 4,640,068 | 2/1987 | Jungwirth et al. . |
| 4,821,474 | 4/1989 | Rodriguez . |

OTHER PUBLICATIONS

"Great Southwest Introduces Hydraulic Pocketshear," *Post-Tension Institute Newsletter*, Spring 1990, p. 2.

*Primary Examiner*—Douglas D. Watts
*Attorney, Agent, or Firm*—Johnson & Gibbs

[57] ABSTRACT

A shearing device for tendons such as wire, rope or cables. The device incorporates a shear block and clamping system having a first cylindrical block adapted for engaging an eccentric recess formed in a housing. Both the housing and the block are constructed with apertures therethrough adapted for receiving the tendon therein. Eccentric misalignment of the apertures is provided by relative rotation between the housing and the block to therein provide the shearing action. A clamp is disposed outwardly of the block for securing the tendon to be terminated. In this manner, a post-tension tendon of the type utilized in concrete construction or the like, can be safely terminated and controlled within a recessed region with efficiency and dimensional control.

20 Claims, 3 Drawing Sheets

CABLE SHEAR AND CLAMP SYSTEM

BACKGROUND OF THE INVENTION

This is a Continuation in Part of U.S. patent application Ser. No. 07/396,341, filed on Aug. 21, 1989 by Alan Rodriguez.

FIELD OF THE INVENTION

The present invention relates to devices for shearing tendons such as cables and, more particularly, to apparatus for clamping and cutting a cable or wire rope of the type utilized in concrete construction.

HISTORY OF THE PRIOR ART

It is common practice in the concrete construction industry to incorporate cable tensioning systems for reinforcement purposes. These systems include both pre-stressed and post-tensioned cables and wire rope. Engineering in the post-tensioning of concrete is a well developed technology and the utilization of such tendons extending through a concrete slab or beam is conventional. The tendons provide structural strength for the concrete in a manner and at a cost not heretofore possible with conventional rebar construction. Utilization of such tendons does, however, require anchor assemblies on opposite ends thereof and the termination of the cable itself at the anchors. The anchor assembly secures the ends of the terminated tendons extending through the concrete bed whereby the tendons remain taut and effective during the life-span of the construction. The effectiveness requires the protection of the terminated tendons, which are usually made of steel or the like, from corrosion. Corrosive forces are well known to cause deterioration in the strength of the concrete if the corrosion is allowed to jeopardize the integrity of the tensioning member. To prevent corrosion of the tendon, the steel fibers are usually sheathed in a plastic membrane throughout the length of the slab. The membranes do, however, require termination at the point where the tendons are secured within the anchor assemblies. The reason is obviously to provide appropriate structural integrity at the secured position.

In the process of post-tensioning, it is important that the tendon is free to move within the hardened concrete so that the tensile load on the tendon is evenly distributed along the entire length of the structure. Methods used to insure that the tendons provide free movement within the hardened concrete include laying a number of strands of wire in a sheath. It is within this sheath that the strands of wire are stressed after the concrete is hardened. After stressing, the wires exposed from the ends of the anchor assemblies are then cut-off or terminated. Just the opposite is true of pre-stressing concrete cables. With such cables, they are first stretched and exposed to the concrete during pouring. They are not covered with a protective sheath due to the fact that it is important that the concrete bond directly to the exposed, taut cable in its pre-stressed condition. Once the forms are set, the tension in the cable is also established so that as the concrete cures it forms a bond directly to the cable and no cable movement is allowed without movement in the concrete itself. There are, of course, advantages to both systems depending on the type of fabrication utilized in the ultimate application.

The present invention pertains to cutting or terminating the tensioning cable at the anchor assemblies utilized in post-tensioning configurations. Pre-stressing configurations do not necessarily require such elaborate anchor assemblies and the associated termination problem because the cables are cemented in the concrete and can simply be cut off during the form removal process. The present invention could, however, be useful in cutting such cable assemblies. Post-tensioning incorporates a duct or plastic tube as described above and the utilization of wedges or anchors on opposite ends to produce the tensile force transmitted through the mono or multi-strand cable. Since the force has to be applied after the concrete has cured up to a point, the tensioning must occur after pouring and the cable termination must occur subsequent thereto. Problems associated therewith obviously include the problem of terminating a cable that has been critically secured in a wedged configuration. The securement must not be effected during cutting and the cable must be left in a condition that does not jeopardize the integrity of the system. However, in many instances this "cutting" is completed by the utilization of a cutting torch, which, by definition, effects the cable, the wedges and the surrounding surfaces with intense heat.

A post-tensioned cable is not easily terminated. The cable is generally recessed within a pocket in the poured concrete and it is extremely difficult to obtain access to the cable with any cutting implement other than a cutting torch. The primary problem with cutting torches is the fact that the flame creates an intense heat that anneals the cable and the wedges which are used for locking the tensioned cable in place. Moreover, the degree of cutting accuracy is limited when using a torch. Annealing alone can very often cause ultimate failure of the tensioning system. In addition, the torch heat enhances the corrosive action of any moisture exposed to the terminated cables. It is well known that intense heat enhances corrosive forces and, as set forth above, it is critical that the cable be protected against corrosion. Most often, this is effected by enclosing the terminated cable or tendon, as it may be called, in a plastic coating or cup. Such a covering requires some exactitude in the cutting configuration so that a precise length is provided at the termination point. With torches and the like, the damage as well as the inaccuracies are manifest in many failures and costly mistakes.

The present invention provides an advantage over the prior art by providing a method of and apparatus for precise clamping and shearing of wire rope and cables in general, and post-tensioning cables in particular. The apparatus is designed to be matingly inserted into the recess or pocket of a post-tension formation area around the tendon and the exposed cable clamped outwardly thereof. A precise cold shear of the cable is then effected within the pocket itself, with the outwardly disposed cable clamped. The cold shear cut is accomplished by the utilization of eccentric apertures in relatively small interlocking blocks which may be received directly within the formation pocket or recess. One block is generally cylindrical in shape and it is constructed with an aperture therethrough in an eccentric location therein. Another block is provided with an aperture formed centrally therethrough for receiving the cable to be terminated. Rotation of the cylindrical block relative to the other block thus produces shear forces that cut the cable at a precise location without the damaging effects of heat and the like. The clamp used therewith prevents the terminated cable portion from immediately unreeling. In this manner the great advantage over prior art systems is afforded in an economically feasible configuration.

SUMMARY OF THE INVENTION

The present invention pertains to methods of and apparatus for shearing and terminating post-tensioning cables/tendons. More particularly, one aspect of the invention comprises a shear block system of the type constructed for receipt and clamping of a tensioning tendon therein and the termination of the tendon by rotation of the blocks and clamping of the exposed tendon. A first cylindrical block is thus constructed for rotational mounting within a second block, and both are adapted for receiving the cable therethrough. The second block has a central aperture formed therein of a size sufficient for easily receiving the cable. The first cylindrical block likewise contains an aperture of generally equivalent size but in an eccentric location. Rotation of the cylindrical block relative to the second block effects total misalignment of the apertures. The misalignment therein terminates the cable which is pinched therebetween and sheared thereacross. A tendon clamp is secured upon the exposed tendon section to prevent this tendon region, which is usually multi-filament cable, from unreeling.

In another aspect, the invention includes a shear block assembly for the cold shear of a tendon. The assembly comprises a housing having an eccentrically positioned recess formed therein with an aperture formed therethrough. A generally cylindrical block is adapted for being received within the recess and having an aperture formed therethrough adapted for positioning in registry with the aperture of the housing in a first positionable mode. Means are provided for imparting relative rotation between the block and the housing whereby the aperture of the block may be positioned out of registry with the aperture of the housing in a second positionable mode. Means are also provided for maintaining the axial relationship between the block and the housing during the relative rotation therebetween. A clamp is provided for substantially securing the configuration of the exposed tendon which results in an efficient cold shear of the tendon extending through the apertures of the housing.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Figure 1:
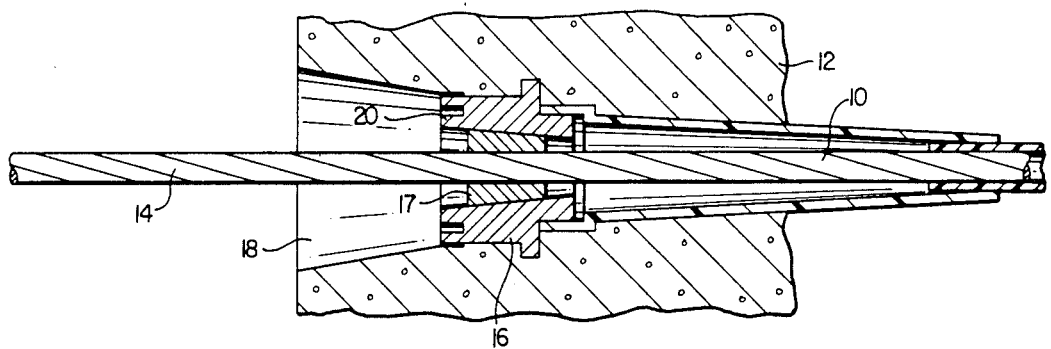
FIG. 1 is a side-elevational, cross-sectional view of an anchor plate assembly and post-tensioning cable extending outwardly from a concrete formation.

Referring first to FIG. 1 there is shown a tensioning cable 10 received within a concrete structure 12 for reinforcement thereof. A cable section 14 extends outwardly of the concrete structure 12 and is secured therein by an anchor plate assembly 16, including securement wedges 17. The assembly 16 is secured within the concrete formation 12 with a pocket 18 formed outwardly thereof. This is a typical construction of a tensioning cable as shown in co-pending patent application Ser. No. 7/396,341 (the '341 Application), the inventor of which is the applicant of the present application. This construction is also shown in U.S. Pat. No. 4,821,474 (the '474 Patent), the inventor of which is the applicant of the present application. As shown in the '474 Patent (which is specifically incorporated herein by reference), the assembly 16 has an outer face 20 that is exposed to the external cable 14. It is the cable 14 extending outwardly from the face 20 that must be terminated and removed from the pocket 18 in order to permit the remaining cable 10 to be sealed and secured within a protective cover or a grout plug (not shown) for purposes of preventing corrosion and to facilitate structural integrity of the assembly. The various elements shown in FIG. 1 which make up the wedge assembly 16 and/or cable sheath with assembly 16 is described in more detail in the '341 Application, which is incorporated herein by reference. It should be noted, however, that the present invention is adapted for cutting any wire rope or cable, although particularly adapted for such post tensioning applications. The terms cable and tendon will be used interchangeably herein.

Figure 2:
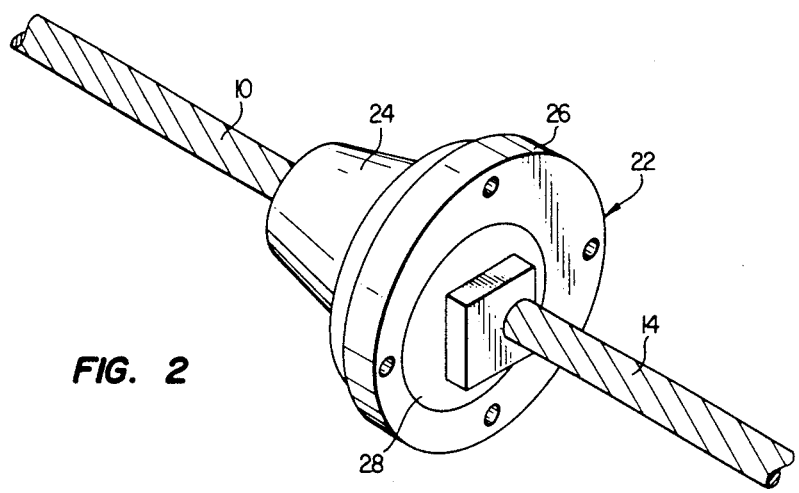
FIG. 2 is a perspective view of one embodiment of a cable shear assembly constructed in accordance with the principles of the present invention.

Referring now to FIG. 2 there is shown a perspective view of a shear cutting block 22 constructed in accordance with the principles of the present invention and adapted for terminating the cable 14 outwardly of the wedge assembly 16 shown in FIG. 1 without the adverse effects normally found in the prior art. This is effected by a "cold shear" as described below. The shear block assembly 22 comprises a conical frontal head 24 which is adapted for being received within the conical side walls of the pocket 18. A cylindrical housing 26 is disposed therebehind and provides the structural region for housing a rotatable cutting block drive 28 disposed therein. The cable 10 is shown to be received within the front end of the frontal cone or head region 24 and outwardly of the cutting block drive 28 as cable section 14. By relative rotation of the cutting drive 28 relative to the housing 26 and the blade within the housing (discussed below), cable sections 10 and 14 will be cold sheared and severed.

Figure 4:
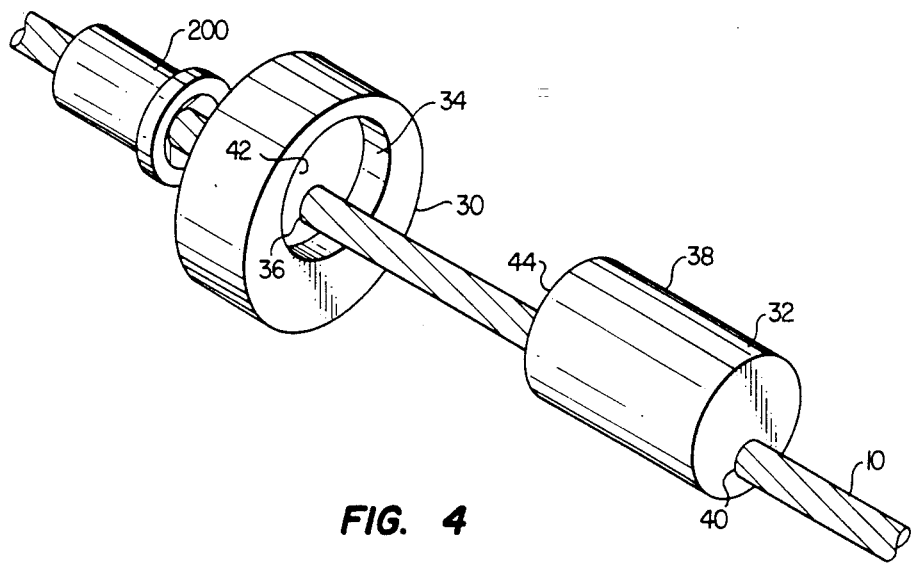
FIG. 4 is a diagrammatic schematic of first and second shear blocks and cable clamp constructed in accordance with the principles of the present invention and utilized for illustrating the method thereof.

Referring now to FIG. 4 there is shown a diagrammatic representation of the eccentric shear block assembly and clamp principle incorporated in the present invention. Shown in FIG. 4 is the cable 10 extending through a first cylindrical block 30, a second eccentric cylindrical block 32 and a clamp 200. The cylindrical block 32 was constructed for being received in a cylindrical recess 34 formed within the first block 30. Within recess 34 is an aperture 36 formed centrally within the block 30. The recess 34 is however formed eccentric relative to the central aperture 36. The cylindrical body 38 of the block 32 is adapted for being received into rotational engagement with the recess 34, whereby aperture 40 extending therethrough will move in and out of alignment with the central aperture 36. The aperture 40 is eccentrically aligned in the block 32 in mating engagement with the eccentric position of the aperture 36 relative to the recess 34 in this manner the block 32 can be received within the block 30 with the cable 10 extending freely therethrough and upon subsequent rotation a complete eccentric misalignment between the apertures 36 and 40 will occur. With sufficient rotational and axial pressure exerted between respective blocks 30 and 32, the eccentric misalignment of said apertures will cause severing of the cable 10 inwardly of the clamp 200. It is clamp 200 which secures the portion of cable 10 extending outwardly from block 30 to prevent it from unreeling and/or otherwise becoming unattached and uncontrolled. It is this principle upon which the present invention operates as shown in more detail below.

Figure 3:
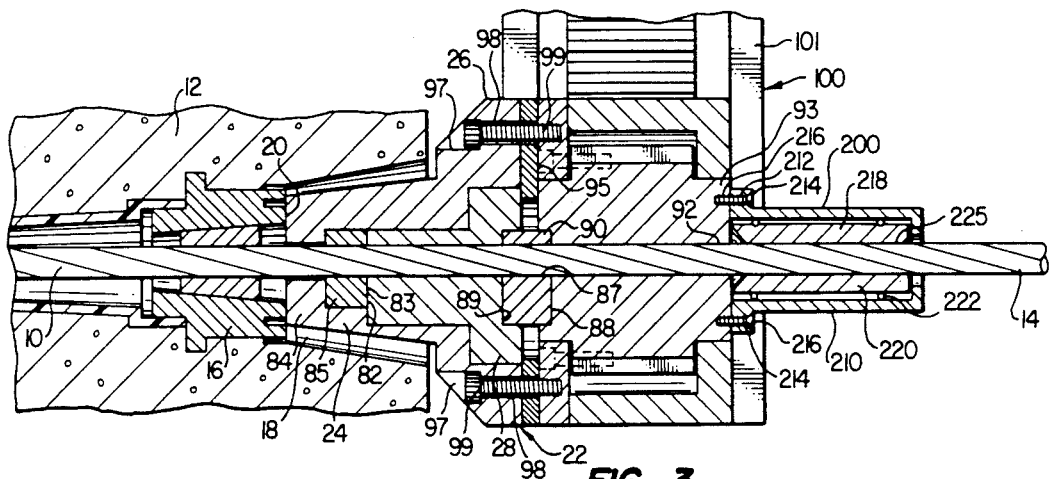
FIG. 3 is an enlarged side-elevational, cross-sectional view of the cable shear assembly of FIG. 2 mounted to a drive system having a cable clamp secured thereto and positioned adjacent the concrete formation.

Referring now to FIG. 3 there is shown an enlarged side-elevational, cross-sectional view of the shear block assembly 22 of FIG. 2 with an associated drive means assembled therewith in accordance with the principles of the present invention. Any number of drive means would be possible, including mechanical, electrical and hybrids thereof. The advantage of the hydraulic variety is the ability to use the same hydraulic pump used to stress the cable. In this particular view the orientation of the assembly 16 is reversed relative to that shown in FIG. 1. The concrete structure 12 is presented to the left of the drawing while the shear block assembly 22 is presented to the right of the drawing. The cable 10 thus extends through the wedge members 17 and outwardly through the pocket region 18 into the conical head 24 of the shear block assembly 22. The face 20 of the assembly 16 is shown to abut the frontal surface of the conical head 24. The conical region 24 is shown to be matingly received within the tapered region of the conical recess 18 to permit sufficient inter-engagement and close proximity for a cut of the cable 10 at the precise location for eliminating an extensive cable region outwardly thereof and permitting close enclosure of the terminated cable section by capping, grouting, or the like shown in the aforesaid co-pending patent application of applicant. Likewise, the length of the cut can be selectively varied to provide different lengths of remaining cable.

Still referring to FIG. 3, the shear block assembly 22 is shown scoured to drive system 100 comprising a rack and pinion assembly 101 adapted for imparting relative rotation between the housing 26 and the member 28. Other drive assemblies may, of course, be used. The housing 26 is scoured to the drive assembly 100 by means of a plurality of threaded fasteners members or bolts 98 extending therebetween. Each bolt is received within an aperture 98 having a counter-sunk head 97 facilitating the positioning thereof. A bearing or pressure plate 95 is sandwiched against the adjacent back sides of housing 26 and member 28 and the frontal surface of drive gear 93 which faces said back sides. Drive gear 93 is constructed with a central aperture 92 formed therethrough adapted for receipt of the cable 14 therein and extending from the member 28. An engaging block or dog 90 interconnects the drive gear 93 and the member 28. This assembly is effected by the formation of a recess 89 formed in the drive member 28 and a mating recess 88 formed in the drive gear 93. The dog 90 is constructed in the present embodiment of a generally square configuration (which could also be oval, rectangular or a shape other than round) which is matingly received within each of the recesses 88 and 89. In this manner the rotation of the gear 93 is coupled directly to the member 28 for rotation thereof. However, the dog 90 can break to relieve pressure in the event of jamming. It may be seen that an aperture 87 is formed eccentrically through the dog 90 to facilitate the passage of the cable 14 therein. This off-center and center alignment is described above. The centered and off-centered or eccentric alignment of the apertures through the myriad of assembled elements described above permits the selective alignment and misalignment of the cable 14 through the shear block 22. It should be noted that during rotation of the gear 93, the dog 90 and member 28, the relative cable position therein does not vary as it extends centrally through the housing 26 and centrally through the drive gear 93. It is the eccentric misalignment of the cutting members and apertures in the frontal portion of the cone 24 which is positioned adjacent the securing wedges 17 that provides for the actual cutting. This shearing action is directly facilitated by the placement of a blade on cutting block 85 in the frontal most region 84 of the cone section 24. This particular cutting block 85 is formed of hardened steel with an eccentric aperture formed therethrough as shown in FIG. 3. It comprises a blade in the sense that it can be replaced and provides a surface against which the cable is sheared. Likewise, the bore or recess region within the cone section 24 adapted for receiving the cutting block 85 is eccentric relative to the central line of the housing 26. This eccentric positioning of the cutting block as well as the eccentric hole location therein prevents its rotation relative to the rotation of the drive member 28. As drive member 28 rotates, its frontal surface 83 is maintained in an abutting relationship with the back surface 82 of the cutting block 85. The cutting block 85 is secured within the cone section 24 and cannot move rotationally relative thereto due to the eccentric recess formed therein and its looked inter-engagement therewith. Therefore, the rotation of the drive member 28 imparts eccentric misalignment between the apertures in frontal surface 83 of drive member 28 and the rear surface 82 of the cutting block 85 causing the shearing and cutting action. This action which is imparted by the rotation of the drive gear 93 and interconnecting dog 90 is induced in the present embodiment by the rack and pinion assembly described in more detail below. It may be seen in FIG. 3 that the rack is mounted integrally with the drive assembly 100 wherein the gear 93 is housed. It may also be seen that the gear 93 is secured within said housing in a manner preventing its axial movement during rotation, which axial movement could permit the creation of a space between the cutting surfaces 82 and 83 of the cutting block 85 and drive member 28, respectively. Such a space would reduce cutting-effectiveness. It is the effective alignment, select misalignment and axial securement during rotational positioning of these various members, as described herein, which provides the multitudes of advantages and the efficiency of the present invention.

Still referring to FIG. 3 there is shown a side-elevational cross-sectional view of the cable clamp secured to the shear block drive system with a cable 10 extending therethrough. The cable clamp 200 comprises, in this particular embodiment, a cylindrical housing 210 having enlarged collar flange 212. The collar flange 212 includes a plurality of radially disposed apertures 214 adapted for receiving threaded fasteners. Threaded fasteners such as screws 216 permit the collar flange 212 to be directly secured to the drive system thus controlling the extending cable 10 following the shearing operation. The cable extending through the aperture of the clamp is controlled by being held therein by a plurality of clamping jaws 218. The clamping jaws 218, in this particular embodiment are comprised of three clamping elements 220 held together by a pair of elastic members 222. In this particular embodiment, the elastic members 222 comprise O-rings disposed at opposite ends of the elements 220; the clamping jaws therein constructed for defining a central aperture 225 therethrough. The diameter of the aperture 225 is smaller than the outside diameter of the cable 14 being secured thereby. In this manner, the cable 14 may be securely held during the termination step. As the shear block 22 is actuated and termination of the cable 14 occurs, the loose end of the cable extending outwardly of the drive system 100 is held within the clamp 200. In the case of multi-wire strand cable 14, this securement prevents the unreeling or unwinding of the coiled wire members making up the cable. Often times the unwinding of the coil wire members can result in the discharge of one or more wire filaments or strands in an uncontrolled fashion.

Figure 5:
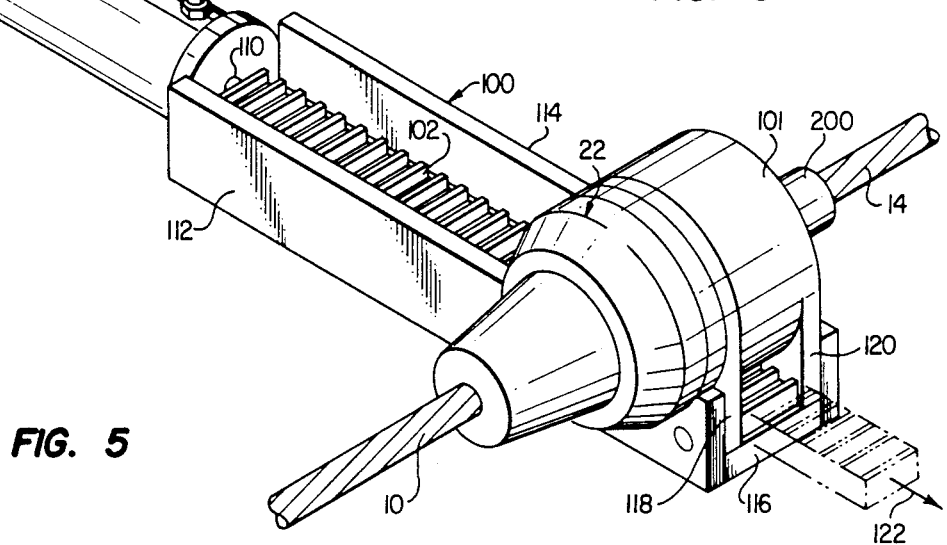
FIG. 5 is an enlarged, front perspective view of the cable shear assembly, drive system and cable clamp of the present invention with a cable shown positioned thereon.

Referring now to FIG. 5 there is shown the shear block assembly 22 and drive system 100 coupled to a rack and pinion drive 101 with clamp 200 extending outwardly therefrom. The rack and pinion drive 101 includes a rack 102 and the pinion of gear 93 shown in FIG. 3. The rack and pinion drive system is powered by a hydraulic cylinder 104 having connecting lines 106 and 108 provided for the full hydraulic actuation of the rack 102. The connecting shaft or ram 110 couples the hydraulic actuation to the hydraulic cylinder to the rack 102. Side frames 112 and 114 comprise the sides of the rack 102 with the base member 116 disposed therebeneath and upon which the rack is permitted to slide. Side frames 112 and 114 and bottom 116 are secured to the hydraulic cylinder 104 by conventional means whereby relative movement may be imparted therebetween by the flow of hydraulic fluid. As stated above, hydraulic fluid is conventionally used to stress the cables and the hydraulic cylinder 104 may be powered by the same hydraulic pump (not shown) used for the construction operation.

Still referring to FIG. 5 the shear assembly 22 is shown with the cable 10 disposed therein and extending outwardly therefrom as cable 14 During the shearing operation, the cable 14 will be severed from the cable section 10. In operation it would protrude from a concrete section 12 as shown in FIGS. 1 and 3 above. To effect the actuation, the side frames 112 and 114 are secured directly to the side frame plates 118 and 120. The side frame 118 and 120 are bolted to the side frames 112 and 114, respectively, by appropriate threaded fasteners to secure and sandwich said drive system 100 therein and drive engagement with the rack 102. With this engagement, actuation of the hydraulic cylinder 104 causes movement in the direction of the arrow 122 and/or in the opposite direction (not shown). This movement imparts the rotation of gear 93 described above (relative to the illustration of FIG. 3) and the eccentric misalignment between the cutting faces described above.

Figure 7:
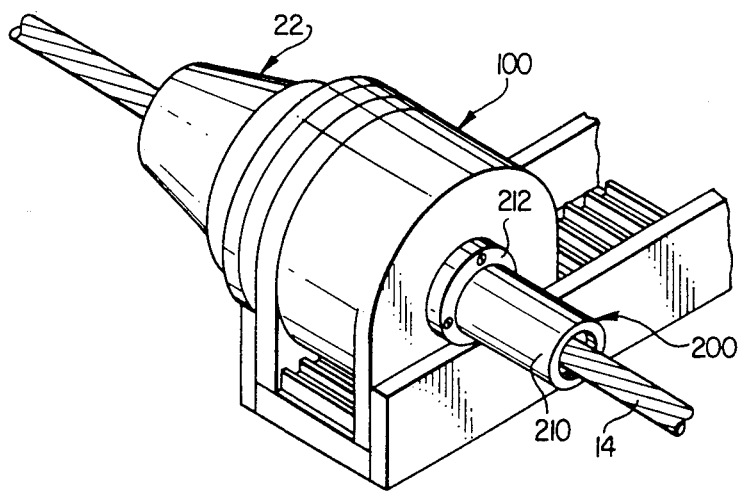
FIG. 7 is an enlarged, rear perspective view of the shear and clamp assembly of FIG. 5 in illustrating the clamp section thereof in more detail.

Referring now to FIG. 7 there is shown a perspective view of the shear block 22 and drive system 100 of the present invention taken from a rear angle. From this view, it may be seen that the clamp extends outwardly from the drive system 100 with the cable 14 extending therethrough. The clamp 200 may be secured to the drive system 100 in a myriad of ways. In a present embodiment a series of screws are provided for securing the enlarged collar flange 212. It should be noted that a variety of couplings assembled to, or forming a part of the cable drive means is contemplated in accordance with the principles of the present invention. Moreover, clamps of varying designs may also be used.

Figure 8:
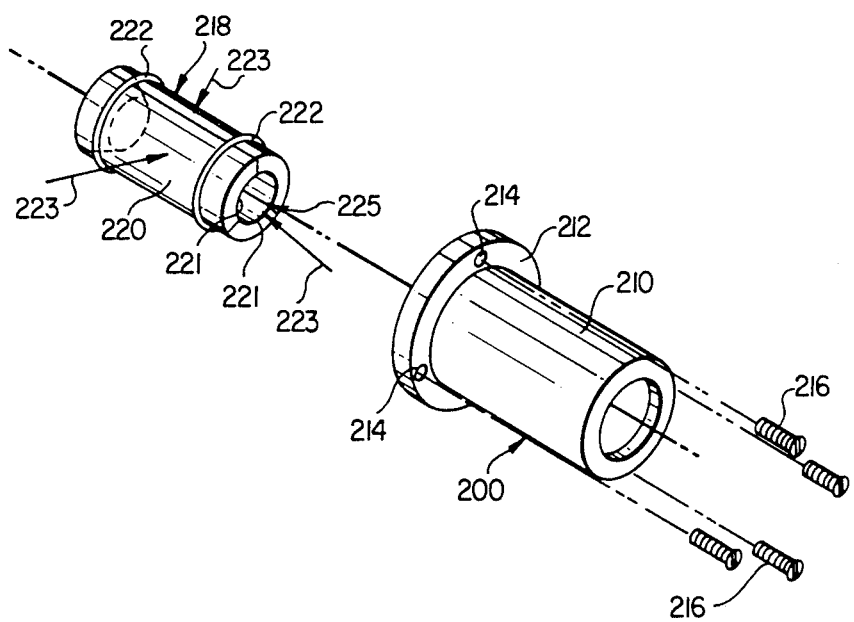
FIG. 8 is an enlarged, exploded, perspective view of the clamp of FIG. 7 illustrating one embodiment of the assembly thereof.

Referring now to FIG. 8, there is shown an enlarged, exploded perspective view of the cable clamp 200 of the present invention. As described above, this particular embodiment incorporates three jaws 218 which are held together by a plurality of elastic clamping members 222. The clamping member comprises an o-ring in the present illustration, which o-ring is sized to afford sufficient clamping force to a particular cable. As also discussed above, each clamping jaw 220 is constructed with an internal arced surface 221 which when combined with the arced surface 221 of the other jaws form a generally cylindrical region adapted for receiving the cable therethrough in a symmetrical clamping thereof. The jaw arrangement provides lateral (or radial) clamping force, as shown by arrows 223. Any jaw configuration capable of providing sufficient radial forces to a particular tendon for the securement of that tendon would be within the scope of the present invention. As shown herein, a series of three jaws is utilized to clamp the multiple strands of a post-tensioning cable to prevent that cable from becoming unraveled during the shearing operation. Two jaws could be used, as could multiple jaws.

Still referring to FIG. 8, the cable clamp 200 comprises a generally cylindrical tubular member having an enlarged collar flange 212 disposed at one end thereof. The collar flange 212 is constructed with apertures 214 for permitting direct securement to the drive system 100. As the diameter of the cable varies, the jaws 220 can be replaced. For much larger cable 14, a larger housing 210 would, of course, have to be utilized to accommodate the larger jaws 220 and arced jaw surfaces 221. In the present invention, a housing 210 constructed of aluminum, or the like, has been found acceptable when used with jaws 220 constructed of steel.

Figure 6:
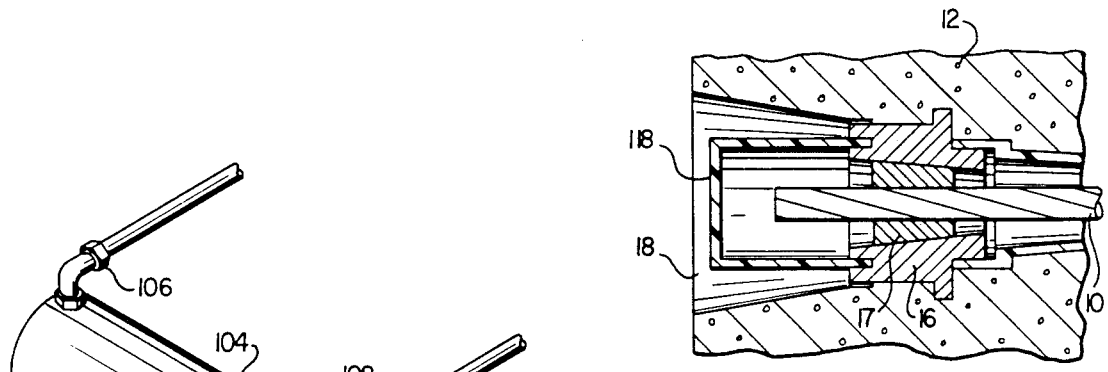
FIG. 6 is a side-elevational, cross-sectional view of the post-tensioning tendon and anchor plate assembly of FIG. 1 after termination of the tendon with the cable shear assembly of the present invention.

In operation, this assembly can be positioned contiguous a concrete slab 12 in mating engagement with the pocket region 18 formed therein. The cable 14 extending therethrough may be terminated to a precise length, which length is established by the thickness of the head region of the cone section 24 and the thickness of the cutting block 85. This length is preferably less than the depth of the pocket 18 and is sufficiently short to permit grouting or the positioning of a covering cap member 118 thereover as shown in FIG. 6. A covering cap 118 is an optional member in most installations. Such a cap is shown in U.S. patent application Ser. No. 7/088,795, referenced above and incorporated herein by reference.

The cable shear device of the present invention has been shown to be effective in completing a cold shear of cable and wire ropes. In effect, any tendon may be severed by the eccentric misalignment shearing device of the present invention. This is particularly true of multi-strand cable where a series of wires must be cut. With the present invention, the wires are generally cut on the order of one at a time during the shearing operation because of the manner of operation. This shearing device has also been shown to be operable through a hydraulic drive system, but it is again pointed out that any number of drive systems may be utilized, depending on the particular application. With post-tensioning structures, the presence of hydraulic systems for the tensioning of the cables renders the utilization of a hydraulic system one of the more efficient approaches. In addition, the shape of the frontal region of the housing, the conical configuration, is designed to permit mating engagement with the standard conical pocket shape conventionally found in post-tension walls. By varying the thickness of the frontal region of the conical section, the precise dimension of the main tendon section can be accurately controlled. Likewise, any changes in this dimension may be imparted to vary the precise dimension of the main tendon. The shearing device of the present invention may also be used at any angular position, including vertical, horizontal or one therebetween. This is particularly useful in construction applications. The assembly, although formed of steel and other relatively heavy materials, can be assembled in a relatively lightweight configuration relative to other constructional tools. An assembly constructed in accordance with the present invention has been constructed with a weight of under 40 pounds, allowing the device to be handled easily on construction jobs. As recited above, the utilization of the cable shear of the present invention eliminates the need for cutting torches and the like which impart the myriad of Problems referenced above.

Having described the invention in connection with certain specific embodiments thereof, it is to be understood that further modifications may now suggest themselves to those skilled in the art and it is intended to cover such modifications as fall within the scope of the appended claims.

I claim:

1. A shear block and clamp assembly for the controlled termination of a cable extending outwardly of a formation, said assembly comprising:
   a shear block housing having an eccentrically positioned recess formed therein, said recess having a generally cylindrical cross-sectional configuration;
   a generally cylindrical block adapted for being received within said cylindrical, eccentric recess formed within said housing;
   said housing being constructed with a central aperture formed therethrough, said aperture opening into said eccentric recess at an off-centered position therein;
   said cylindrical block being constructed with an aperture formed therethrough, said aperture being formed in an off-centered position therein for alignment with said aperture opening into said recess of said housing in a first positionable mode whereby a cable may be received therethrough;
   means for positioning said housing adjacent said formation in receipt of said cable extending outwardly thereof;
   means for imparting relative rotation between said block and said housing whereby said aperture of said block may be positioned out of registry with said recess of said housing for terminating said cable at a select location therealong;
   a clamp adapted for receipt of said cable therein and positioning relative to said shear block housing; and
   means associated with said clamp for engaging said cable and providing pressure thereagainst for securing said cable during the termination of said cable.

2. The apparatus as set forth in claim wherein said formation comprises a post-tensioning concrete formation and said cables extending outwardly therefrom comprise post-tensioning cables, said formation having a pocket formed therein for exposing said cable extending outwardly thereof, and said housing having a frontal region formed of a generally conical configuration adapted to be matingly received within said pocket.

3. The apparatus as set forth in claim 2 wherein said conical portion of said housing has an aperture formed therethrough in a generally axial relationship therewith.

4. The apparatus as set forth in claim wherein said assembly further includes a cutting blade adapted for being received between said cylindrical block and said recess of said housing, said blade having an aperture formed therethrough for receiving said cable and providing a cutting surface against which said cable may be sheared during relative rotation between said block and said housing.

5. The apparatus as set forth in claim 1 wherein said means for imparting relative rotation between said block and said housing comprises hydraulic drive means adapted for rotating said block relative to said housing.

6. The apparatus as set forth in claim and further including a pressure plate positioned against said block and said housing for preventing relative axial movement therebetween during relative rotational movement.

7. The apparatus as set forth in claim 6 wherein said means for imparting relative rotation between said block and said housing comprises a rack and pinion assembly positioned adjacent said pressure plate for sandwiching said pressure plate between said pinion and said housing and block assembly.

8. The apparatus as set forth in claim wherein said clamp includes means associated therewith for securing said clamp relative to said housing.

9. The apparatus as set forth in claim 1 wherein said cable engaging means comprises a plurality of jaws received within said clamp and biased one toward the other for providing lateral pressure to said cable.

10. A shear block assembly for the controlled cold shear of a tendon comprising:
    a shear block housing having an eccentrically positioned recess formed therein with an aperture formed therethrough;
    a generally cylindrical block adapted for being received within said recess and having an aperture formed therethrough adapted for positioning in registry with said aperture of said housing in a first positionable mode;
    means for imparting relative rotation between said block and said housing whereby said aperture of said block may be positioned out of registry with said aperture of said housing in a second positionable mode;
    means for maintaining the axial relationship between said block and said housing during said relative rotation therebetween for effecting cold shear of said tendon extending through said apertures thereof whereby said tendon may be terminated at a select location therealong;

a clamp adapted for receipt of said tendon therein and positioning relative to said housing; and means associated with said clamp for engaging said tendon within said aperture and providing pressure thereagainst for securing said tendon during the termination thereof.

11. The apparatus as set forth in claim 10 wherein said tendon is disposed in a post-tensioning concrete formation and said tendons extend outwardly therefrom, said formation having a pocket formed therein for exposing said tendon extending outwardly thereof, and said housing having a frontal region formed of a generally conical configuration adapted to be matingly received within said pocket.

12. The apparatus as set forth in claim 11 wherein said conical portion of said housing has an aperture formed therethrough in a generally axial relationship therewith.

13. The apparatus as set forth in claim 10 wherein said assembly further includes a cutting blade adapted for being received between said cylindrical block and said recess of said housing, said blade having an aperture formed therethrough for receiving said tendon and providing a cutting surface against which said tendon may be sheared during relative rotation between said block and said housing.

14. The apparatus as set forth in claim 10 wherein said means for imparting relative rotation between said block and said housing comprises hydraulic drive means adapted for rotating said block relative to said housing.

15. The apparatus as set forth in claim 10 and further including a pressure plate positioned against said block and said housing for preventing relative axial movement therebetween during relative rotational movement.

16. The apparatus as set forth in claim 10 wherein said clamp includes means associated therewith for securing said clamp relative to said housing.

17. The apparatus as set forth in claim 10 wherein said tendon engaging means comprises a plurality of jaws received within said clamp and biased one toward the other for providing lateral pressure to said tendon.

18. A method for clamping and the cold shear termination of a tendon, said method comprising the steps of:

providing a housing having an eccentrically positioned recess formed therein with an aperture formed therethrough;

providing a generally cylindrical block having an aperture formed therethrough adapted for positioning in registry with said aperture of said housing in a first positionable mode;

receiving said block within said recess of said housing;

receiving said tendon through said block and said housing with a portion thereof extending outwardly therefrom for termination;

securing said outwardly extending tendon portion relative to said block for preventing said tendon portion from unreeling;

imparting relative rotation between said block and said housing whereby said aperture of said block may be positioned out of registry with said aperture of said housing in a second positionable mode; and maintaining the axial relationship between said block and said housing during said relative rotation therebetween for effecting cold shear of said tendon extending through said apertures thereof whereby said secured tendon may be terminated at a select location therealong.

19. The method as set forth in claim 18 wherein said step of securing said tendon includes the step of clamping said outwardly extending tendon portion with pressure lateral thereto and preventing said tendon from unreeling from said block.

20. A cable clamping member for use with a cable shear of the type wherein first and second blocks are rotated relative to each other for the termination of a cable extending therethrough, said clamp comprising:

a housing;

a plurality of clamping jaws disposed within said housing;

means securing said clamping jaws one to the other and biasing said clamping jaws toward a central axial region;

means for securing said cable to be terminated within said housing between said clamping jaws; and means for securing said housing relative to said cable shear.

* * * * *